(12) United States Patent
Chang et al.

(10) Patent No.: US 7,369,367 B2
(45) Date of Patent: May 6, 2008

(54) DISK DRIVE VOICE COIL MOTOR YOKE ASSEMBLY HAVING PROXIMITY LATCH MAGNET PAIR ATTRACTING AND HOLDING VOICE COIL BIAS STEEL THEREBETWEEN

(75) Inventors: Joseph Chang, San Jose, CA (US); Lam Tran, San Jose, CA (US); Tho Pham, Milpitas, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 126 days.

(21) Appl. No.: 10/805,543

(22) Filed: Mar. 19, 2004

(65) Prior Publication Data
US 2004/0179304 A1   Sep. 16, 2004

Related U.S. Application Data

(63) Continuation-in-part of application No. 10/117,518, filed on Apr. 4, 2002, now Pat. No. 6,967,822.

(51) Int. Cl.
*G11B 5/54* (2006.01)
*G11B 21/22* (2006.01)

(52) U.S. Cl. .................... 360/256.2; 360/265.1
(58) Field of Classification Search ............. 360/256.2, 360/256, 265.1
See application file for complete search history.

(56) References Cited

U.S. PATENT DOCUMENTS 5,742,453 A * 4/1998 MacPherson ............ 360/256.2
5,801,907 A * 9/1998 Yagi et al. ............... 360/256.2
6,252,744 B1 * 6/2001 Kelemen .................. 360/256.2
6,445,548 B1 * 9/2002 Sasaki et al. ............ 360/256.2

FOREIGN PATENT DOCUMENTS

JP          08111077 A   *   4/1996

* cited by examiner

*Primary Examiner*—Craig A. Renner
(74) *Attorney, Agent, or Firm*—Earle Jennings; GSS Law Group

(57) ABSTRACT

The invention includes a yoke assembly containing a top and a bottom proximity latch magnet. The invention includes a voice coil attached to a voice coil bias steel. The crash stop includes a magnetic proximity latch created by the voice coil bias steel attracted to the top and bottom proximity latch magnets. It may also include using the magnetic proximity latch with a magnetically weakened contact latch. Experiments have shown that the combined magnetic proximity latch and the magnetically weakened contact latch require significantly less initial releasing force than the prior art crash stops, and meet rotary shock requirements. The invention includes making the actuator assembly, the voice coil motor assembly, and the CSS hard disk drive. The invention includes operating the CSS hard disk drive with at least the magnetic proximity latch.

25 Claims, 11 Drawing Sheets

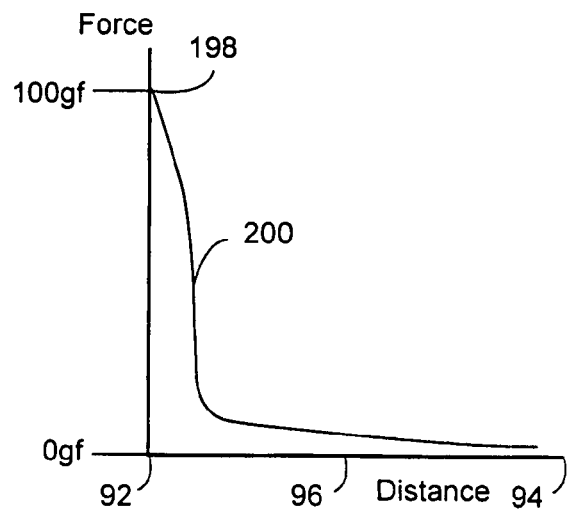
Fig. 4A
Prior Art
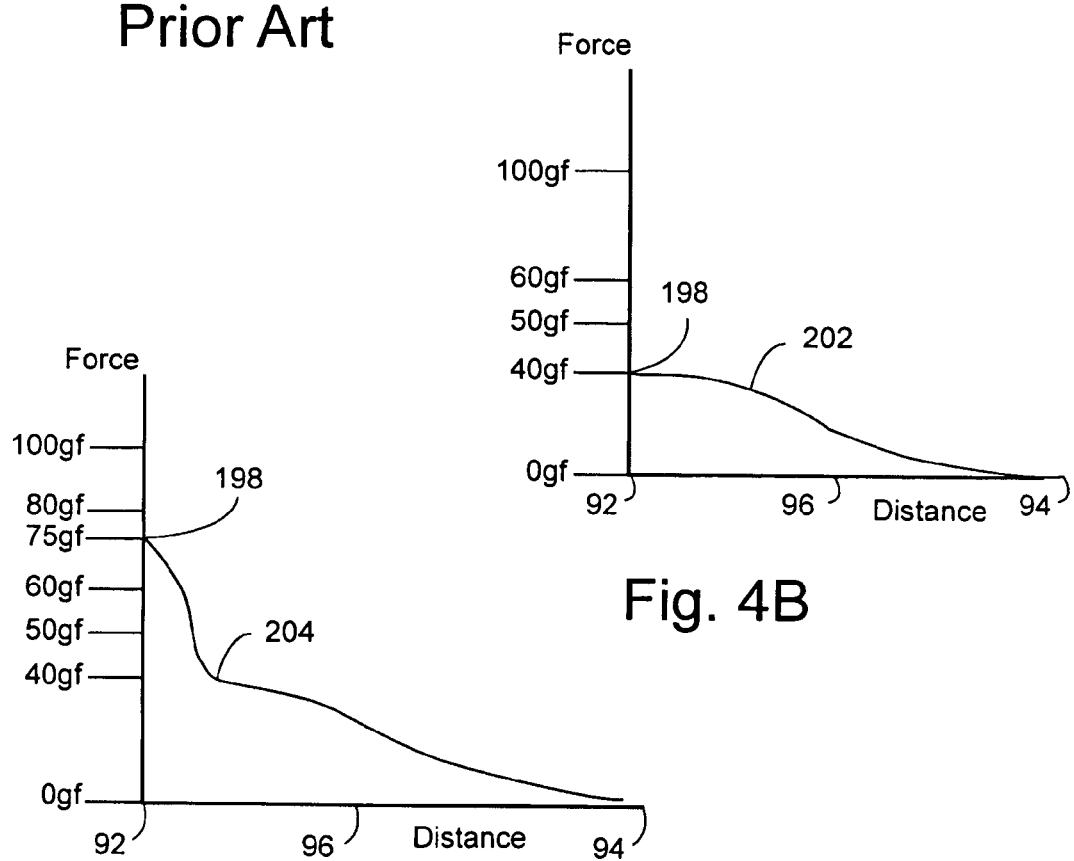
Fig. 4B
Fig. 4C

DISK DRIVE VOICE COIL MOTOR YOKE ASSEMBLY HAVING PROXIMITY LATCH MAGNET PAIR ATTRACTING AND HOLDING VOICE COIL BIAS STEEL THEREBETWEEN

CROSS REFERENCE TO RELATED APPLICATIONS

The present application is a continuation in part of patent application Ser. No. 10/117,518, filed Apr. 4, 2002 now U.S. Pat. No. 6,967,822, entitled: PROXIMITY LATCH MECHANISM USING AN IMPACT REBOUND CRASH STOP FOR AN OUTSIDE DISK RAMP LOADING DISK DRIVE, The specification and drawings of which are hereby incorporated by reference in their entirety.

BACKGROUND OF THE INVENTION

1. Field of the Invention

The present invention relates to crash stops which park the read-write heads near the disk pack spindle in a Crash Start/Stop (CSS) hard disk drive.

2. Background Information

Modem hard disk drives include a servo controller driving a voice coil which acts upon an actuator assembly to position a read-write head near a track on a rotating disk surface. The read-write head communicates with the servo controller, providing feedback, which is used in controlling the read-write head's positioning near the track. The read-write head is embedded in a slider, which floats on a thin air bearing a very short distance above the rotating disk surface.

A voice coil motor assembly typically includes a voice coil, which swings at least one actuator arm in response to the servo controller. Each actuator arm includes at least one head gimbal assembly typically containing at least one slider. The head gimbal assembly couples to the actuator arm in the voice coil motor assembly.

A hard disk drive may have one or more disks. Each of the disks may have up to two disk surfaces in use. Each disk surface in use has at least one associated slider, with the necessary actuator arm. Hard disk drives typically have only one voice coil actuator. The disk(s) rotates about the spindle motor hub, which contains all of the disks.

When the hard disk drive is not in operation, industry practice is to park the actuator arms holding the read-write heads either near the spindle motor hub or away from the spindle motor hub. This practice evolved as a way to minimize contact and collision damage between the read-write head(s) and the disk surface(s). This invention relates to hard disk drives, which park the read-write heads near the spindle motor hub. These hard disk drives are often known as "Crash Start/Stop" or CSS hard disk drives.

Some hard disk drives use the other crash stop mechanism, parking the read-write heads away from the spindle motor hub, essentially outside the disk diameter. These are sometimes referred to as OD or "Outside Diameter" hard disk drives.

Both crash stop mechanisms must prevent damage to the actuator assembly, particularly the read-write heads, by withstanding rotary shocks in the plane of the disks. Today hard disk drives must withstand rotary shocks of radial shock strength lasting one or more milliseconds. The radial shock strength is often 30,000 radians per second per second.

There is a problem with existing magnetic latching mechanisms used in CSS hard disk drives. The latching mechanism commonly used is a magnetic contact latch, which requires a strong initial releasing force to unpark the actuator assembly. This strong initial releasing force may be 100 to 120 grams of force. Magnetic contact latches require this strong initial releasing force only for a brief distance to unpark the actuator assembly. This requirement creates control difficulties immediately after the initial release of the actuator assembly. The actuator assembly swings hard and fast at first. Time and energy are lost bringing the actuator assembly motion under control. What is needed is a latching mechanism for a CSS hard disk drive meeting the rotary shock requirement, while requiring much less initial releasing force.

SUMMARY OF THE INVENTION

The invention includes a yoke assembly containing a top proximity latch magnet and a bottom proximity latch magnet. The top proximity latch magnet attaches to the top yoke plate. The bottom proximity latch magnet attaches to the bottom yoke plate. The top proximity latch magnet and the bottom proximity latch magnet share a common magnetic north pole.

The invention also includes a voice coil attached to a voice coil bias steel. The crash stop of an actuator assembly within the voice coil motor assembly includes a magnetic proximity latch. The magnetic proximity latch is created by the voice coil bias steel engaging the top and bottom proximity latch magnets in the yoke assembly. This magnetic proximity latch, when used alone, requires a relatively small initial releasing force as shown in FIG. 4B.

The invention also includes using the magnetic proximity latch with a magnetically weakened contact latch formed by a magnetically weakened voice coil crash stop contacting a yoke crash stop. The yoke crash stop is preferably formed in the yoke top plate of stainless steel, which is magnetically permeable. The magnetically weakened voice coil crash stop may be formed of a less permeable material and/or include an insulative layer. Both approaches weaken the initial releasing force required to disengage the magnetic contact latch.

Experiments have shown that crash stops built with the combined magnetic proximity latch and the magnetically weakened contact latch require significantly less initial releasing force than the prior art crash stops. These experiments confirmed that CSS hard disk drives using these combined magnetic latches meet and/or exceed the assignee's rotary shock requirement for production.

In embodiments where there is essentially no magnetic contact latch, the magnetically weakened voice coil crash stop is formed of an impermeable material and/or the insulative layer essentially blocks formation of the magnetic contact latch.

The invention includes making the actuator assembly using the voice coil attached to the voice coil bias steel and a magnetically weakened voice coil crash stop as shown in FIGS. 1B to 1D, and 8A.

A voice coil motor assembly is made by mounting the actuator assembly by its actuator pivot to a disk base plate. The voice coil is positioned between the top voice coil fixed magnet and the bottom voice coil fixed magnet to create the magnetic proximity latch for the crash stop, as shown in FIGS. 1B to 1D. The magnetic proximity latch is created by the attraction of the voice coil bias steel to the top proximity latch magnet and to the bottom proximity latch magnet, as in FIGS. 1C and 1D. The yoke assembly is then fixedly attached to the disk base plate as in FIGS. 2A to 2C.

The yoke mount coupling is preferably inserted into the base yoke mount coupling in the disk base plate. The base yoke mount coupling is shown in FIG. 8A.

The invention includes making a CSS hard disk drive using the voice coil motor assembly attached to the disk base plate as indicated in the exploded diagram of FIG. 6. The invention applies to CSS hard disk drives with at least one disk. The CSS hard disk drive may include more than one disk.

The invention includes operating a CSS hard disk drive with at least the magnetic proximity latch. The actuator assembly is unparked by directing the voice coil driver of FIG. 7 to apply an unparking signal state to the voice coil. The voice coil interacts with the fixed magnets in the voice coil motor assembly to generate a first initial releasing force pattern similar to FIG. 4B. Alternatively, if the CSS hard disk drive includes both the magnetic proximity latch and the magnetically weakened contact latch, the voice coil interaction generates a second initial releasing force pattern similar to FIG. 4C.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 4A shows a typical initial releasing force pattern for a prior art CSS hard disk drive;

FIG. 4B shows a first initial releasing force pattern similar to the estimated initial releasing force pattern of a CSS hard disk drive employing only the invention's magnetic proximity latch in its crash stop;

FIG. 4C shows a second initial releasing force pattern similar to the estimated initial releasing force pattern of a CSS hard disk drive employing the invention's magnetic proximity latch, and the magnetically weakened contact latch, in its crash stop;

DESCRIPTION OF THE PREFERRED EMBODIMENTS

Figure 1A:
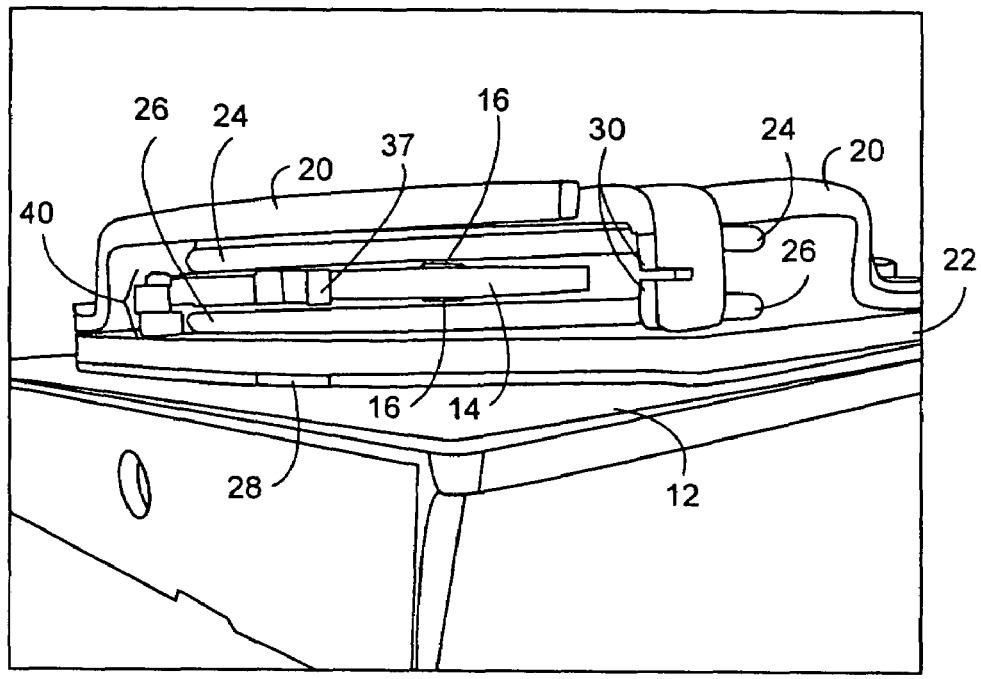
FIG. 1A shows a voice coil interacting with a crash stop in a prior art CSS hard disk drive.

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

Table One of named elements, reference numbers and Figures.

| Named element | Reference | Figures |
|---|---|---|
| Magnetic proximity latch | 6 | 1C |
| Yoke assembly | 8 | 3A and 3C |
| CSS hard disk drive | 10 | 2A to 2D, 5, 6, 7 |
| Disk base plate | 12 | 1A to 2D, 6, 8A, 8B |
| Voice coil | 14 | 1A to 2D, 5, 7 to 8B |
| Actuator pivot | 16 | 1A to 2D, 5, 8A, 8B |
| Voice coil motor assembly | 18 | 2A to 2C, 5 to 7 |
| Yoke top plate | 20 | 1A to 2C, 3A to 3C, 5, 7 |
| Yoke bottom plate | 22 | 1A to 1D, 3A to 3C, 5, 7 |
| Top voice coil fixed magnet | 24 | 1A to 1D, 3A to 3C, 7 |
| Bottom voice coil fixed magnet | 26 | 1A to 1D, 3A to 3C, 7 |
| Yoke mount coupling | 28 | 1A to 1D, 3B, 3C |
| Yoke crash stop | 30 | 1A to 1D, 3B, 3C |

-continued

Table One of named elements, reference numbers and Figures.

| Named element | Reference | Figures |
|---|---|---|
| Top proximity latch magnet | 32 | 1B to 1D, 3C |
| Bottom proximity latch magnet | 34 | 1B to 1D, 3C |
| Voice coil bias steel | 36 | 1B to 1D, 8A |
| Voice coil crash stop (Prior Art) | 37 | 1A |
| Magnetically weakened voice coil crash stop | 38 | 1B to 1D, 8A |
| Magnetically weakened contact latch | 39 | 1C |
| Impact rebound | 40 | 1A to 11D, 3B, 3C |
| Outside diameter impact rebound crash stop | 44 | 8B (Prior Art) |
| Outside diameter head ramp | 46 | 8B (Prior Art) |
| Base yoke mount coupling | 48 | 8A |
| Actuator arm | 50 | 2A to 2D, 5, 7, 8A, 8B |
| . . . | 52, 54, 56 | 5 |
| Actuator assembly | 58 | 2D, 5, 7 |
| Head gimbal assembly | 60 | 2A to 2D, 5, 7 to 8B |
| . . . | 62, 64, 66 | 5 |
| Axis of disk rotation | 68 | 2A to 2D, 5, 8A |
| Spindle motor | 70 | 2A to 2C, 6 |
| Disk spacer | 72 | 6 |
| Disk Clamp | 74 | 6 |
| Disk separator plate | 76 | 2A, 2B |
| Spindle motor hub | 78 | 2A to 2D, 5 |
| Disk, First | 80 | 2C, 2D, 5, 6, 8A, 8B |
| Disk, Second | 82 | 6 |
| Printed circuit board | 84 | 6, 7 |
| Main flex circuit | 86 | 2A to 2C, 5, 7 |
| Flex circuit | 88 | 7 |
| Track | 90 | 2D |
| Inside Diameter-parked | 92 | 2A, 2D, 4A to 4C |
| Outside Diameter | 94 | 2B, 2D, 4A to 4C |
| Intermediate Diameter | 96 | 2C, 2D, 4A to 4C |
| Preamplifier | 98 | 5, 7 |
| Flex connector | 100 | 2A to 2C, 5, 7 |
| Disk top plate | 110 | 6 |
| Initial releasing force | 198 | 4A to 4C |
| Force-distance trace for prior art contact latch | 200 | 4A |
| First initial releasing force pattern | 202 | 4B |
| Second initial releasing force pattern | 204 | 4C |
| Slider | 208 | 2D, 7 |
| Read-write head | 210 | 2D, 7 |
| Micro-actuator | 212 | 2D, 7 |
| Micro-actuator control bundle | 220 | 7 |
| Micro-actuator control bundle connection | 222 | 7 |
| Pre-amplifier signal connection | 224 | 7 |
| Connector to flex circuitry | 226 | 7 |
| Voice coil drive signal(s) | 242 | 7 |
| Micro-actuator driver signals | 252 | 7 |
| PES signal | 272 | 7 |
| Voice coil driver | 500 | 7 |
| Voice coil driver control(s) | 502 | 7 |
| Micro-actuator driver | 1010 | 7 |
| Micro-actuator driver controls | 1012 | 7 |
| Servo-controller | 1030 | 7 |
| Servo Memory | 1040 | 7 |
| Access between servo-controller and servo memory | 1032 | 7 |
| Embedded computer | 1100 | 7 |
| Memory accessed by embedded computer | 1120 | 7 |
| Access between embedded computer and accessible memory | 1122 | 7 |
| Embedded disk controller program system | 1128 | 7 |
| Channel interface | 1140 | 7 |
| Communication between channel interface & embedded computer | 1142 | 7 |
| Channel interface signals with flex circuit | 1152 | 7 |
| Servo controller program system | 2000 | 7, 9A |
| Program step parking actuator assembly | 2012 | 9A |
| Program step unparking actuator assembly | 2022 | 9A to 9C |
| Detailed program steps unparking actuator assembly | 2032, 2052 | 9B, 9C |
| Flowchart arrows | 2010, 2014, 2020, 2024, 2030, 2034, 2050, 2052, 2054 | 9A to 9C |
| Terminating flowchart | 2016, 2036, 2056 | 9A to 9C |

Figure 3A:
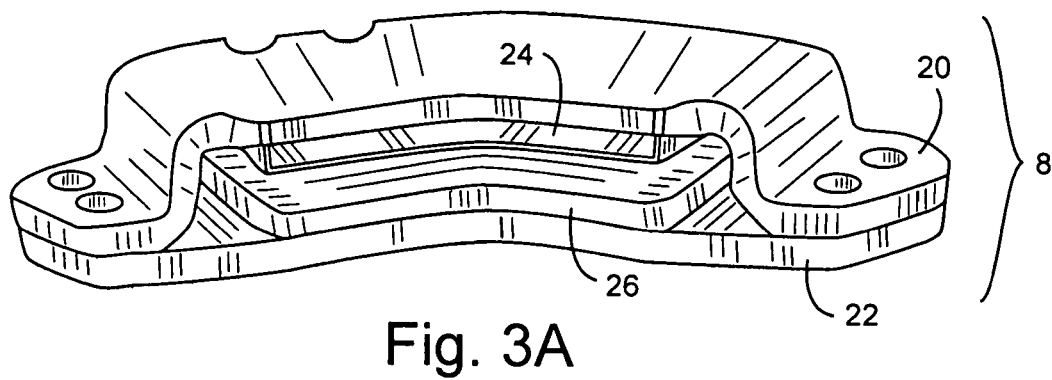
FIG. 3A shows a front perspective view of the invention's yoke assembly for a CSS hard disk drive.
Figure 3B:
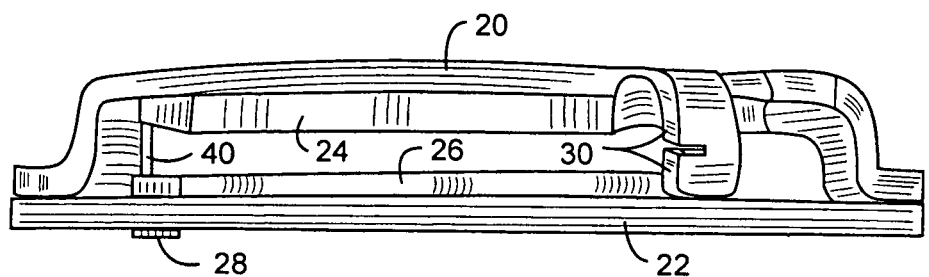
FIG. 3B shows a back perspective view of a yoke assembly of the prior art.
Figure 3C:
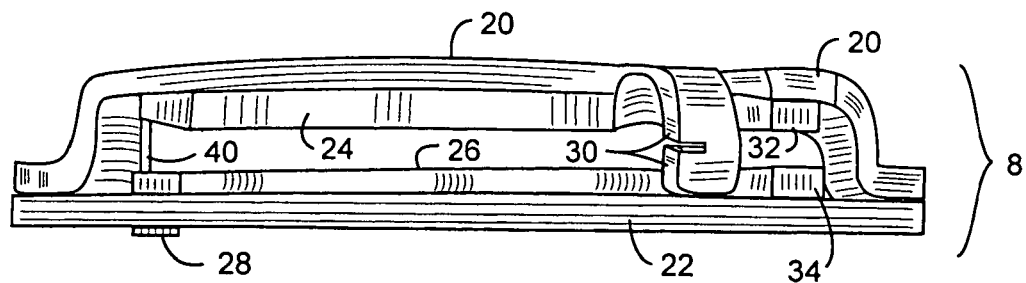
FIG. 3C shows the back perspective view of the invention's yoke assembly.
Figure 5:
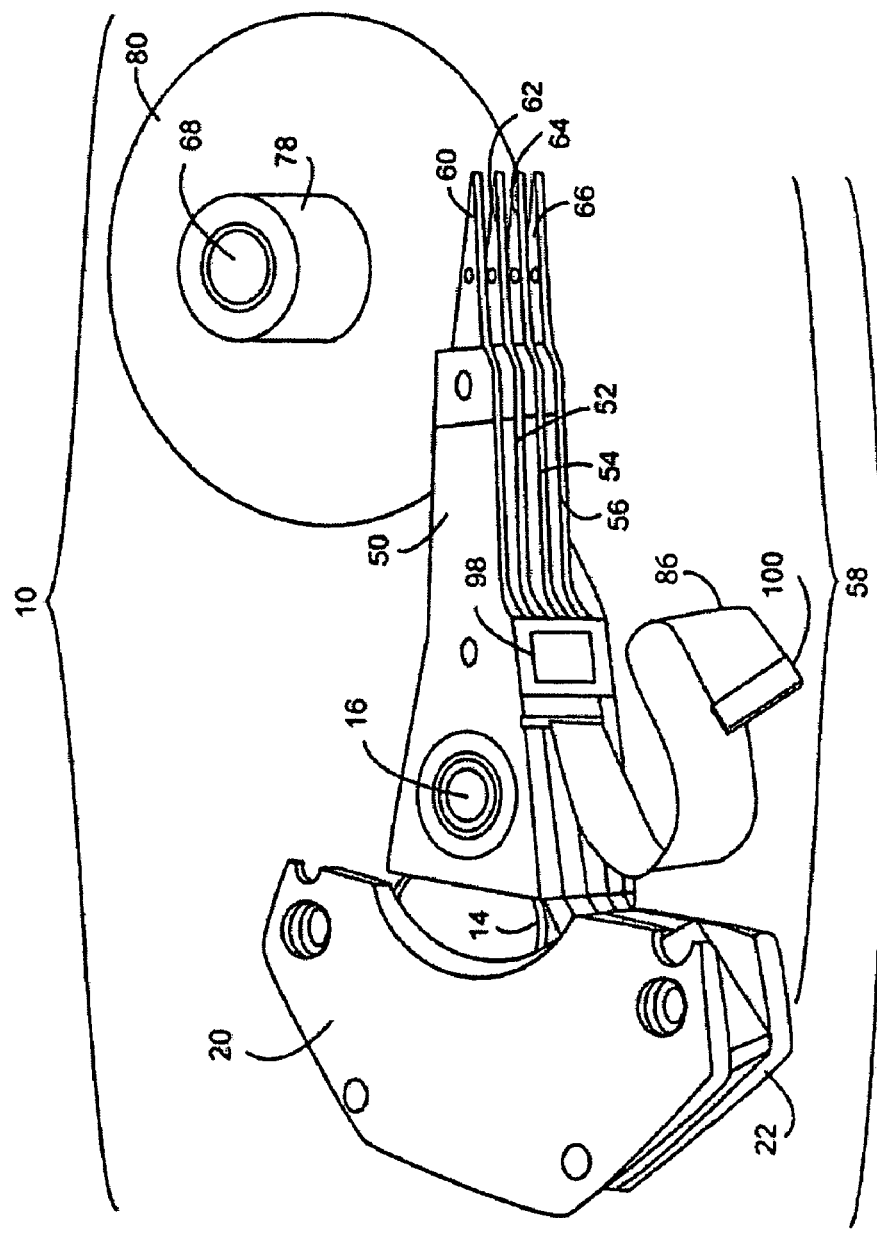
FIG. 5 shows the invention applied to an actuator assembly including more than one actuator arm, each with at least one head gimbal assembly.

The invention includes a yoke assembly 8 including a top proximity latch magnet 32 and a bottom proximity latch magnet 34 as shown in FIG. 3C. The top proximity latch magnet 32 attaches to the top yoke plate 20 as shown in FIGS. 1B, 1C, 1D, and 3C. The bottom proximity latch magnet 34 attaches to the bottom yoke plate 22. The top proximity latch magnet 32 and the bottom proximity latch magnet 34 share a common magnetic north pole.

Figure 1B:
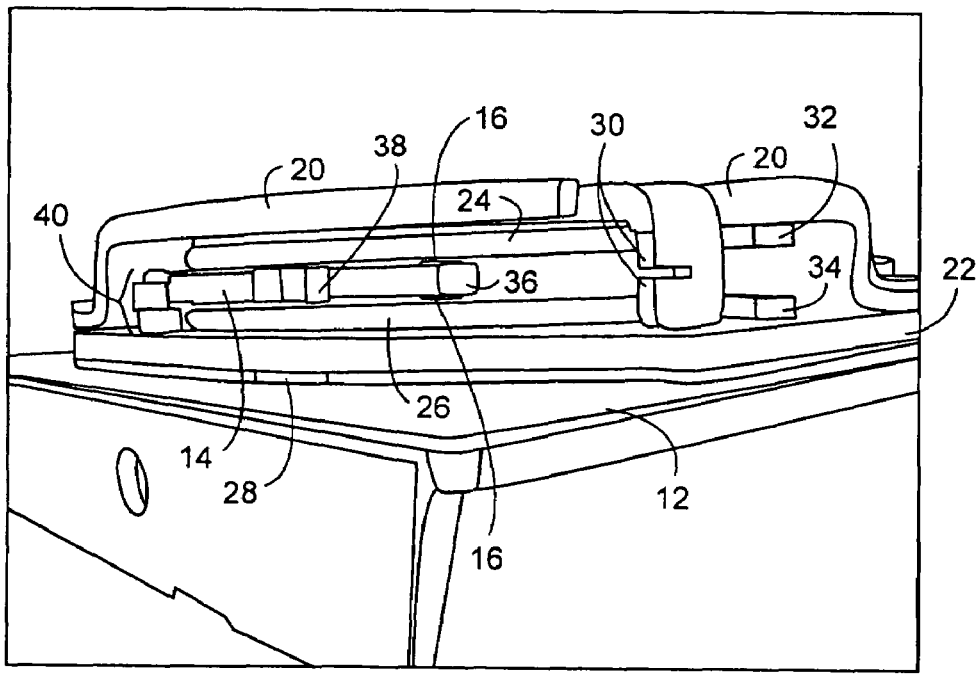
FIG. 1B shows a voice coil contacting the impact rebound with the magnetic proximity latch disengaged from the bias steel in a CSS hard disk drive.
Figure 1C:
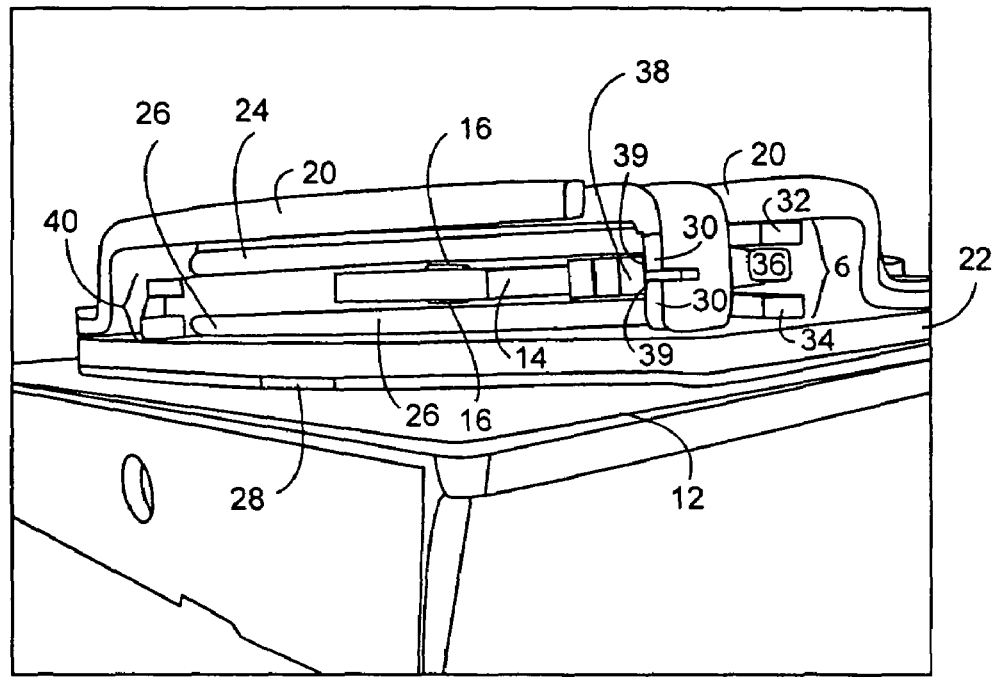
FIG. 1C shows the voice coil of FIG. 1B contacting the crash stop, using the engaged magnetic proximity latch.

The invention also includes a voice coil 14 attached to a voice coil bias steel 36 as shown in FIG. 1B to 1D, and 8A. The crash stop of a voice coil motor assembly 18 includes a magnetic proximity latch 6 as shown in FIG. 1C. The magnetic proximity latch 6 is created by the voice coil bias steel 36 engaging the top and bottom proximity latch magnets 32 and 34 in the yoke assembly 8 as in FIGS. 1C and 1D. This magnetic proximity latch 6, when used alone, requires a relatively small initial releasing force 198 to release the latch as shown in FIG. 4B.

The invention also includes using the magnetic proximity latch 6 with a magnetically weakened contact latch 39 formed by a magnetically weakened voice coil crash stop 38 contacting a yoke crash stop 30 as in FIG. 1C. Preferably, the yoke crash stop 30 is formed from the yoke top plate 20 of stainless steel, which is magnetically permeable. The magnetically weakened voice coil crash stop 38 may be formed of a less permeable material and/or include an insulative layer. Both approaches weaken the initial releasing force 198 required to disengage the magnetic contact latch 39. This weakened initial releasing force 198 is shown in FIGS. 4B and 4C. Insulating the magnetically weakened voice coil crash stop 38 from contact with the yoke crash stop 30 may keep any magnetic contact latch 39 from forming. FIG. 4B shows the results of keeping any magnetic contact latch from forming.

FIG. 1A shows a voice coil 14 interacting with crash stop 30 in a prior art CSS hard disk drive. FIG. 4A shows a typical initial releasing force pattern 200 for a prior art CSS hard disk drive. A typical initial releasing force 198 is between 100 and 120 grams of force for a 3.5 inch CSS hard disk drive. The initial releasing pattern 200 requires the interaction, between the voice coil 14 and the fixed magnets 24 and 26, to deliver a sharp force releasing the actuator assembly 58 from parking. This causes a problem for the servo controller 1030, in that once released, the signals 242 driving the voice coil 14 must be rapidly and strongly altered, to bring the movement of the actuator assembly 58 under control. This wastes time and energy, which is particularly valuable in battery powered applications.

FIG. 1C shows the voice coil 14 of FIG. 1B contacting the crash stop 30 using the magnetic proximity latch 6 which engages top and bottom proximity latch magnets 32 and 34 with the bias steel 36. In this situation, the head gimbal assembly 60 of the voice coil motor assembly 18 is parked near the inside diameter 92, as shown in FIG. 2A.

FIG. 1B shows a voice coil 14 contacting the impact rebound 40 with the magnetic proximity latch magnets 32 and 34 disengaged from the bias steel 36 in the CSS hard disk drive 10. In this situation, the head gimbal assembly 60 is near the outside diameter 94, as shown in FIG. 2B.

Figure 1D:
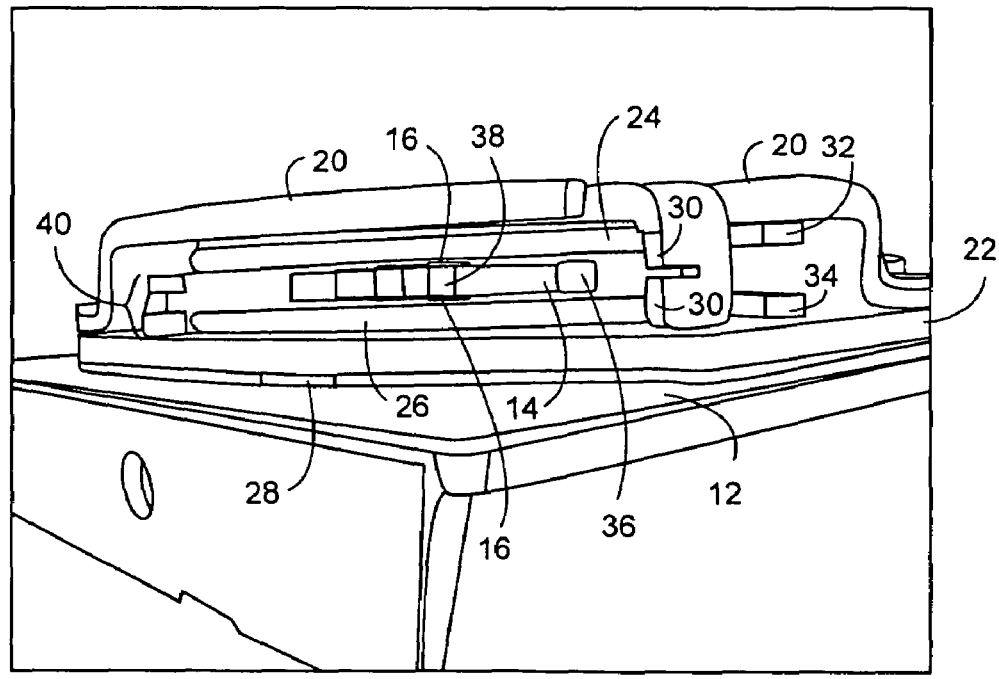
FIG. 1D shows the voice coil of FIGS. 1B and 1C, between the impact rebound and the crash stop, beginning to engage the magnetic proximity latch.

FIG. 1D shows the voice coil 14 of FIGS. 1B and 1C between the impact rebound 40 and the crash stop 30 beginning to engage the bias steel 36 with the magnetic proximity latch magnets 32 and 34. In this situation, the head gimbal assembly 60 of the actuator assembly 58 is between the inside diameter 92 and the outside diameter 94, indicated by 96, in FIG. 2C.

Figure 2A:
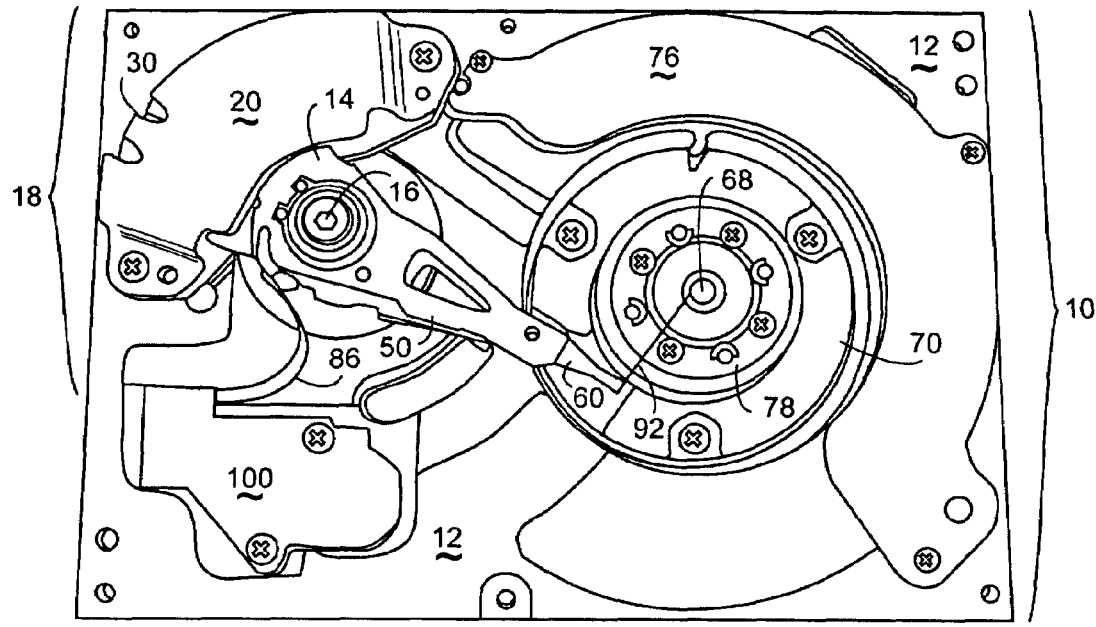
FIG. 2A shows the head gimbal assembly of the actuator assembly near the outside diameter, based upon the conditions shown in FIG. 1B.
Figure 2B:
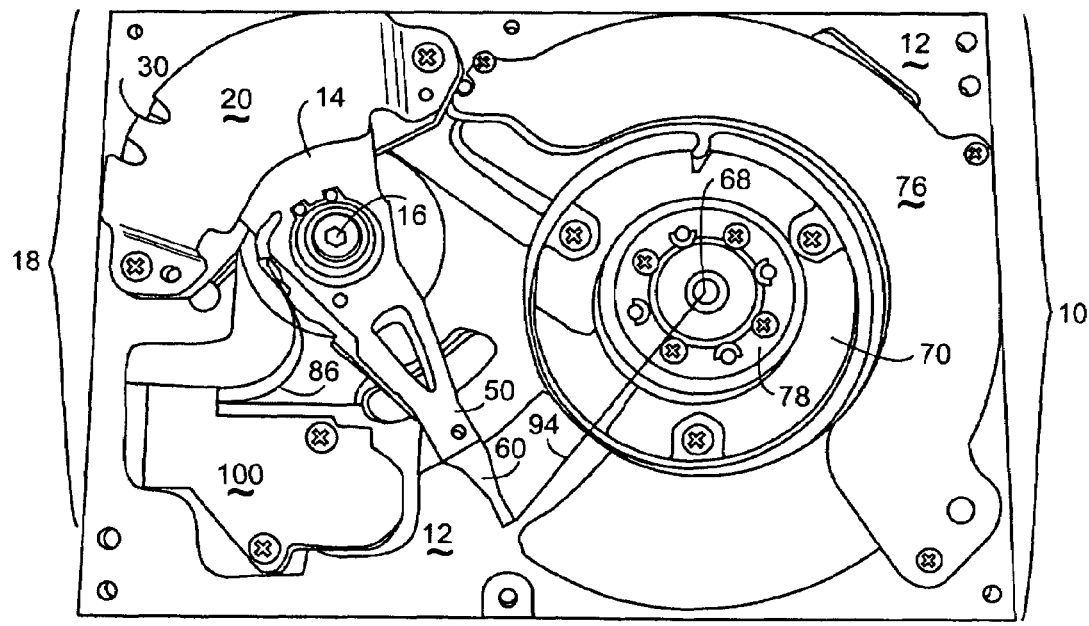
FIG. 2B shows the head gimbal assembly of the actuator assembly near the inside diameter, based upon the conditions shown in FIG. 1C.
Figure 2C:
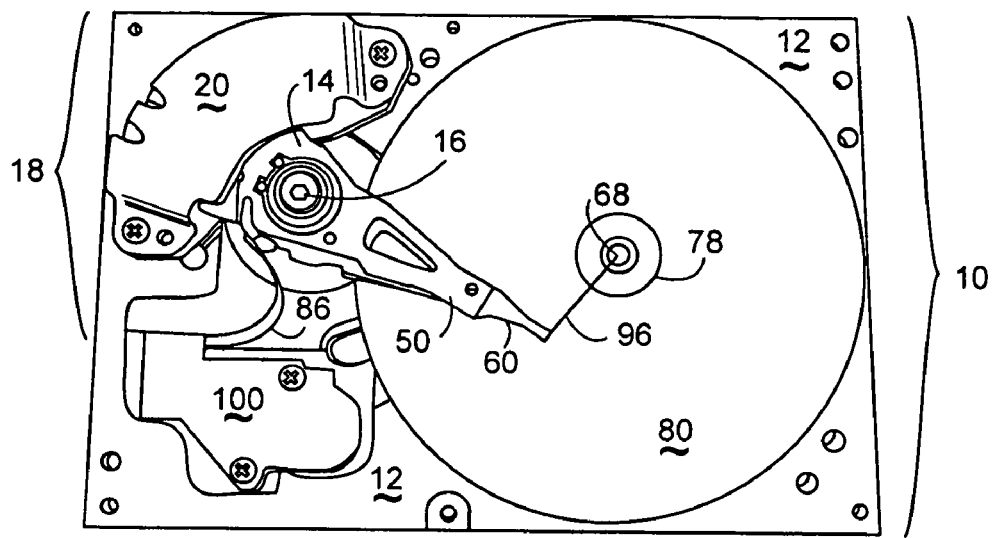
FIG. 2C shows the head gimbal assembly of the actuator assembly between the inside diameter and the outside diameter, based upon the conditions shown in FIG. 1D.
Figure 2D:
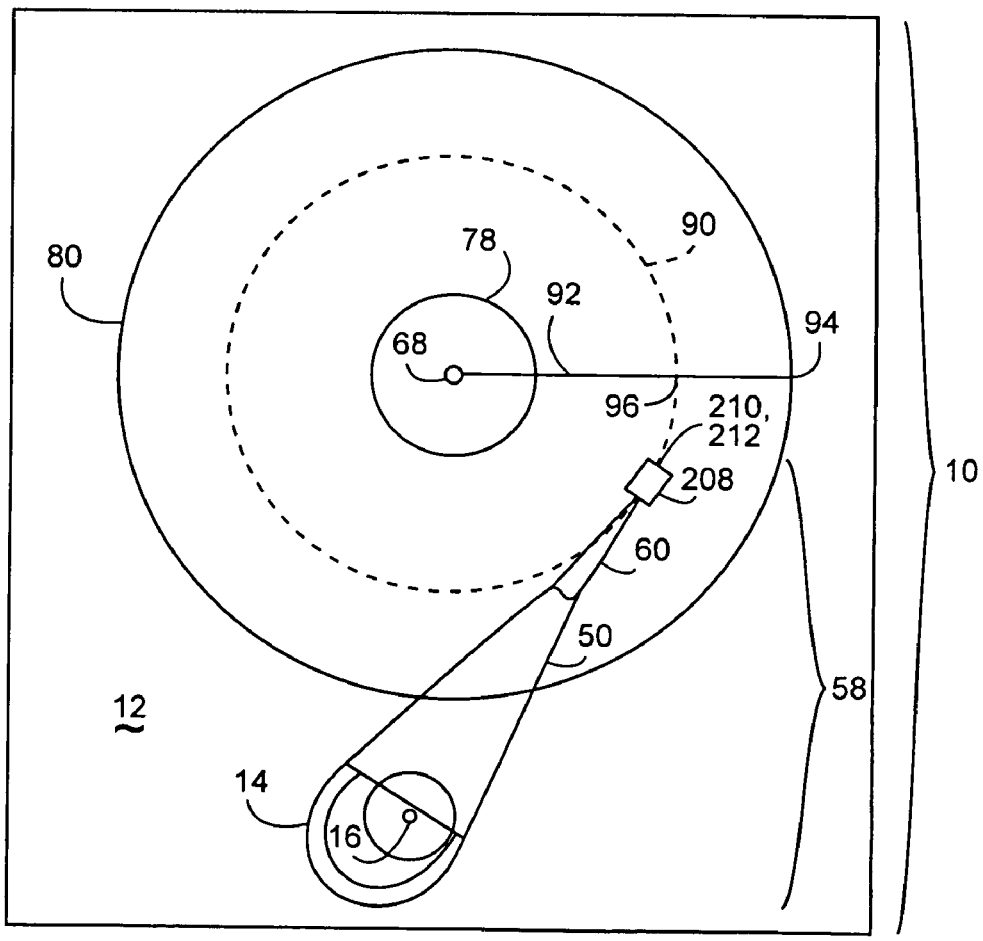
FIG. 2D summarizes several mechanical relationships involved in the operation of the CSS hard disk drive, shown in part by FIGS. 2A to 2C.

FIG. 2D summarizes several mechanical relationships involved in the operation of the CSS hard disk drive 10, shown in part by FIGS. 2A to 2C. The CSS hard disk drive 10 includes an actuator assembly 58 mounted upon a base plate 12. The actuator assembly 58 is included in the voice coil motor assembly 18, shown in FIGS. 2A to 2C. The actuator assembly 58 includes a voice coil 14 coupled with at least one actuator arm 50. The actuator arm 50 further couples with a head gimbal assembly 60, which includes at least one slider 208. Each slider 208 includes at least one read-write head 210. The head gimbal assembly may further preferably include at least one micro-actuator 212, providing fine positioning for the read-write head 210 to follow a track 90 on a rotating disk surface 80. The read-write head 210 interacts with the track 90 to access data stored on the rotating disk surface 80. Data access can involve any combination of reading and writing operations involving the data stored in the track 90.

In FIGS. 2A and 2D, the inside diameter 92 represents the slider 208, and consequently, the read-write head 210 positioned over the disk surface 80, essentially as close to the spindle motor hub 78 as possible. When CSS hard disk drives 10 are not in operation, this is where the actuator assembly 58 is parked. FIG. 1C shows the bias steel 36 engaging with the magnets 32 and 34 to close the magnetic proximity latch 6 of the invention. In the prior art CSS hard disk drives, the initial releasing force 198 is large, often at least 100 grams of force, as shown in FIG. 4A. In embodiments of the invention using just a magnetic proximity latch 6, the initial releasing force 198 may be as low as 40 grams of force. When both a magnetic proximity latch 6 and a magnetically weakened contact latch 39 are employed, an initial releasing force 198 of about 75 grams of force has been experimentally confirmed, as shown in FIG. 4C.

In FIGS. 2B and 2D, the outside diameter 94 represents the slider 90 with the read-write head 210 essentially as far from the spindle motor hub 78 as possible, which is near the outside of the rotating disk surface 80. To keep the actuator assembly 58 constrained to operate over the disk surface 80, an impact rebound 40 is built into the yoke top plate 20, as shown in FIGS. 1A to 1D, and 3B and 3C. FIG. 1B shows the voice coil 14 contacting the impact rebound 40.

In FIG. 2D, an intermediate diameter 96 represents the slider 208, and the read-write head 210, positioned over a track 90. In both FIGS. 2C and 2D, the intermediate diameter 96 is between the inside diameter 92 and the outside diameter 94, in the region actively used for data storage on the disk surface 80. Within this active region, the magnetic proximity latch releases, as shown in FIGS. 4B and 4C. Note that in the prior art, the magnetic contact latch has already been released, as shown in FIG. 4A.

In FIGS. 2A and 2B, a disk separator plate 76 is shown. The CSS hard disk drive 10 may preferably include the disk separator plate 76. Further, the assembled CSS hard disk drive 10 may preferably include the disk top plate 110 of FIG. 6 on top of disk 80, on top of disk separator plate 76, on top of disk 82, on top of the disk base plate 12. This assembly may preferably create regions near the disk separator plate where the distance to the disk surfaces is less than the boundary layer thickness of the air, when the disks are rotating in normal operations. It may also be preferred that a region between the top disk plate 110 and disk 80, over the disk separator plate 76 have a distance of less than the boundary layer thickness. It may also be preferred that a region between the disk 82 and the disk base plate 12, under the disk separator plate 76 have a distance of less than the boundary layer thickness.

FIG. 3A shows a front perspective view of the invention's yoke assembly 8 for a CSS hard disk drive. FIG. 3B shows a back perspective view of the prior art, yoke assembly. FIG. 3C shows the back perspective view of the invention's yoke assembly 8.

Both the invention and prior art yoke assemblies include a top yoke plate 20 attached to a bottom yoke plate 22 as shown in FIGS. 3A to 3C. The top voice coil fixed magnet 24 attaches to the top yoke plate 20. The bottom voice coil fixed magnet 26 attaches to the bottom yoke plate 22. The top yoke plate 20 typically includes the yoke crash stop 30 and the impact rebound 40. The bottom yoke plate 22 includes a yoke mount coupling 28.

The invention includes making the actuator assembly 58 using the voice coil 14 attached to the voice coil bias steel 36 as shown in FIGS. 1B to 1D, and 8A. The voice coil 14 is further preferably attached to a magnetically weakened voice coil crash stop 38.

Figure 8A:
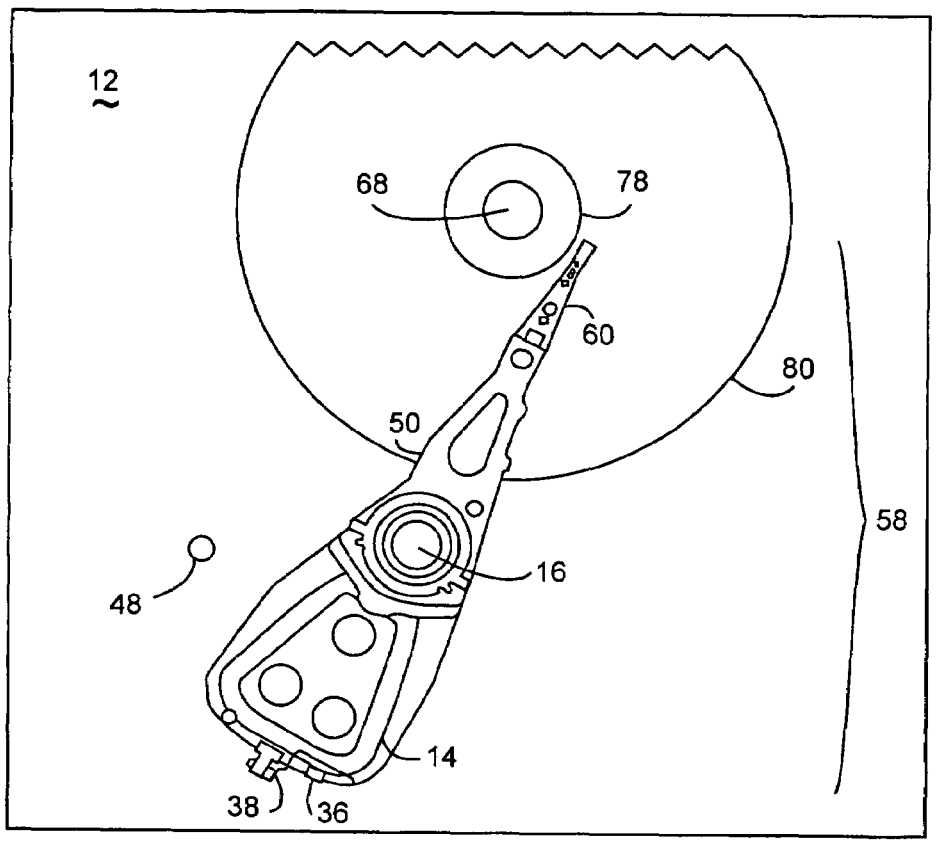
FIG. 8A shows the actuator assembly coupled to the disk base plate, which contains the base yoke mount coupling.
Figure 8B:
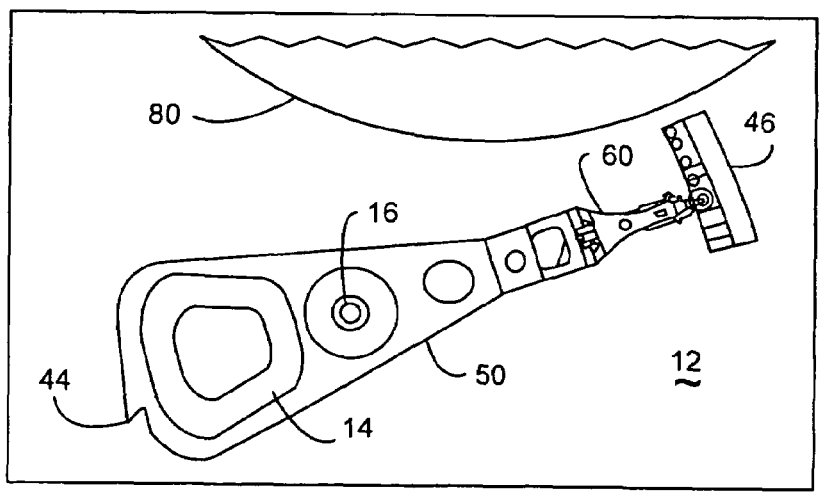
FIG. 8B shows an OD (Outside Diameter) hard disk drive of the prior art including a ramp where the head gimbal assemblies are parked.

The voice coil motor assembly 18 is made as follows. The actuator assembly 58 mounts through the actuator pivot 16 to the disk base plate 12 as shown in FIG. 8A. The voice coil 14 is positioned between the top voice coil fixed magnet 24 and the bottom voice coil fixed magnet 26, as shown in FIG. 1B to 1D. The magnetic proximity latch 6 is created by attraction of the voice coil bias steel 36 to the top proximity latch magnet 32 and to the bottom proximity latch magnet 34, as shown in FIG. 1C. The yoke assembly 8 is fixedly attached to the disk base plate 12, as shown in FIGS. 1B to 2C.

Preferably, the yoke mount coupling 28, shown in FIGS. 1B to 1D and 3C, engages the base yoke mount coupling 48, shown in FIG. 8A, to align the yoke assembly 8 with the actuator assembly 58. The yoke assembly 8, with the voice coil 14 inside, mounts through the coupling of 28 to 48. The positioning of the voice coil 14 permits the range of motion shown in FIGS. 1A to 1D, moving the head gimbal assembly 60 as shown in FIGS. 2A to 2C.

Figure 6:
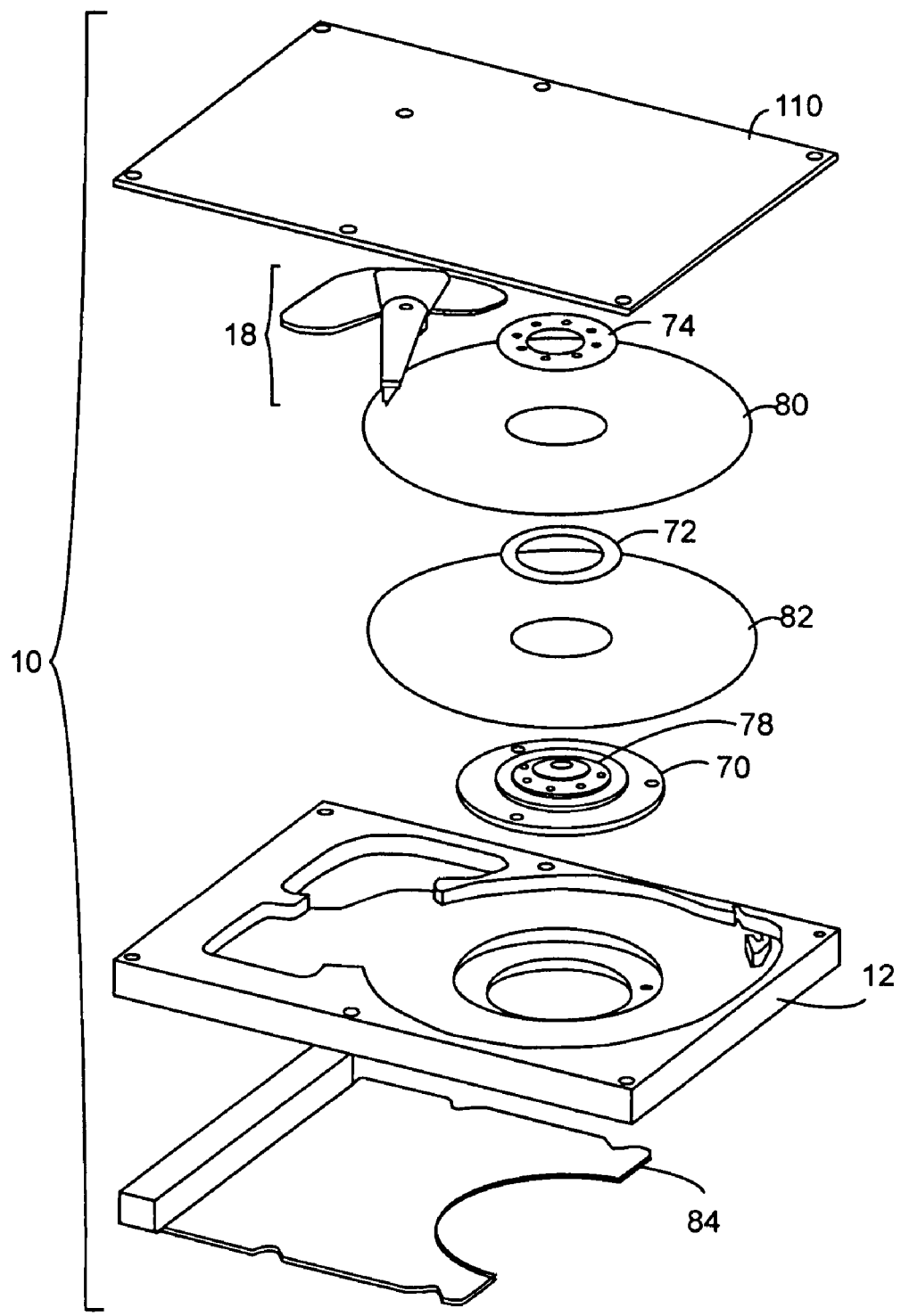
FIG. 6 shows an exploded view of the components used to assemble a CSS hard disk drive using a voice coil motor assembly including various embodiments of the invention in its crash stop.

The invention includes using the voice coil motor assembly 18 attached to the disk base plate 12 with the other large components, to make the CSS hard disk drive 10, as indicated in the exploded diagram of FIG. 6. The invention applies to CSS hard disk drives 10 with at least one disk 80. The CSS hard disk drive 10 may include more than one disk 80 and 82, as shown in FIG. 6.

Experiments have shown that crash stops built with this combined magnetic proximity latch 6 and magnetically weakened contact latch 39 require significantly less initial releasing force 198 than prior art crash stops. The releasing force patterns seen in the experiments is similar to FIG. 4C. These experiments confirmed that CSS hard disk drives 10 using these magnetic proximity latch 6 and weakened magnetic contact latch 39 meet and/or exceed the assignee's rotary shock requirement for production.

In embodiments where there is essentially no magnetic contact latch 39, the magnetically weakened voice coil crash stop 38 is preferably formed of an impermeable material and/or of an insulative layer. This magnetically weakened voice coil crash stop 38 essentially blocks formation of the magnetic contact latch 39.

Alternatively, in embodiments where there is essentially no magnetic contact latch 39, the yoke crash stop 30 may preferably be formed of an impermeable material and/or of an insulative layer. This yoke crash stop 30 essentially blocks formation of the magnetic contact latch 39.

Figure 7:
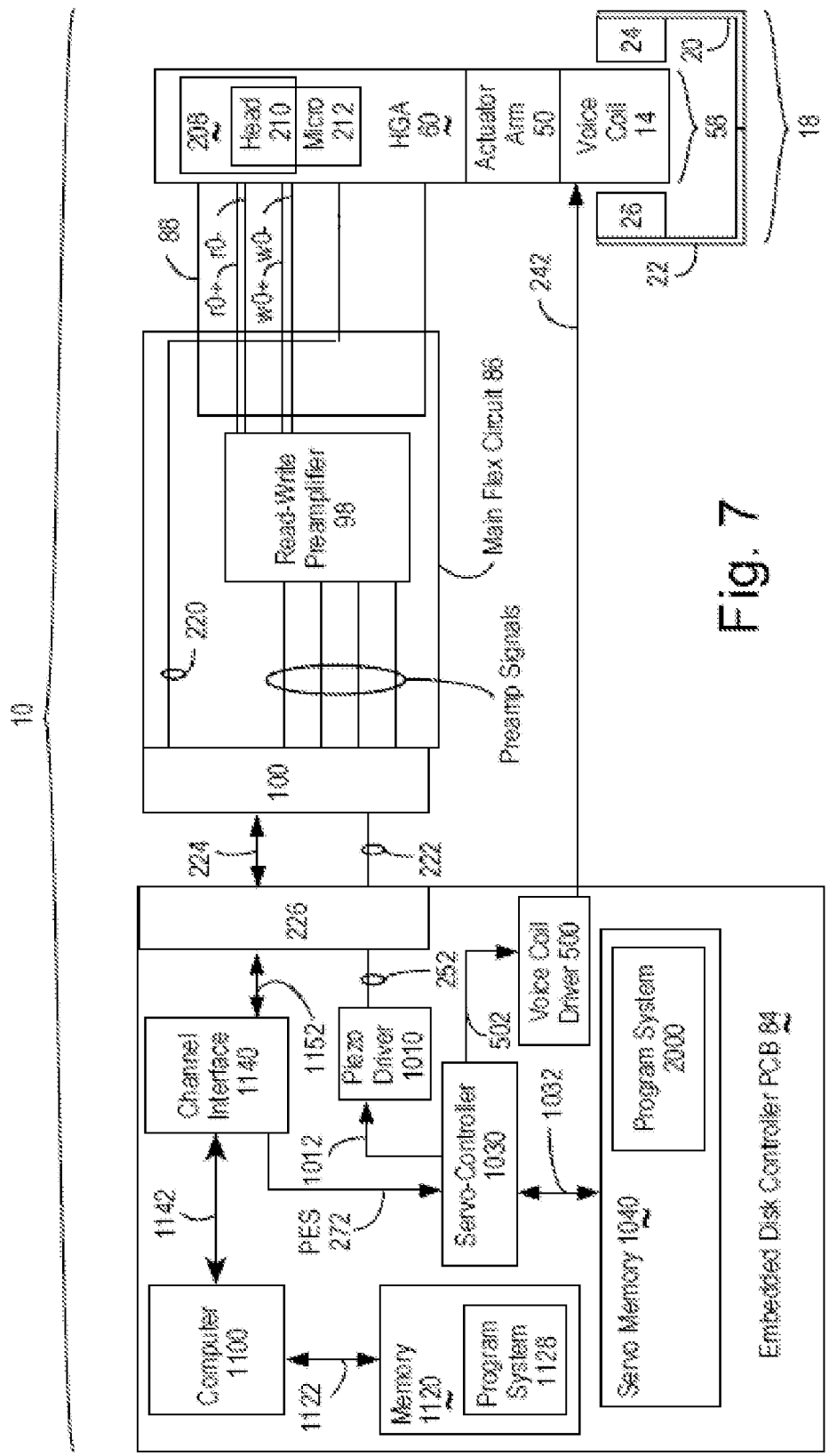
FIG. 7 shows a simplified schematic of the operations of the electronics of a typical CSS hard disk drive employing the invention.

The invention includes operating a CSS hard disk drive 10 with at least a magnetic proximity latch 6. The actuator assembly 18 is unparked by directing the voice coil driver 500 of FIG. 7 to apply 242 an unparking signal state to the voice coil 14. The voice coil 14 electrically coupled 242 to the voice coil driver 500. The servo-controller 1030 directs 502 the voice coil driver 500 to apply 242 an unparking signal state to the voice coil 14. This triggers the voice coil 14 to interact with the top voice coil fixed magnet 24 and with the bottom voice coil fixed magnet 26 to unpark the actuator assembly 58. FIG. 1C progressing to FIG. 1D shows the actuator assembly 58 being unparked. The voice coil 14 interacts with the fixed magnets 24 and 26 in the voice coil motor assembly 18 to generate a first initial releasing force pattern 202 similar to FIG. 4B.

Alternatively, if the CSS hard disk drive 10 includes both the magnetic proximity latch 6 and the magnetically weakened contact latch 39, the voice coil 14 interaction generates a second initial releasing force pattern 204 similar to FIG. 4C.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element.

Figure 9A:
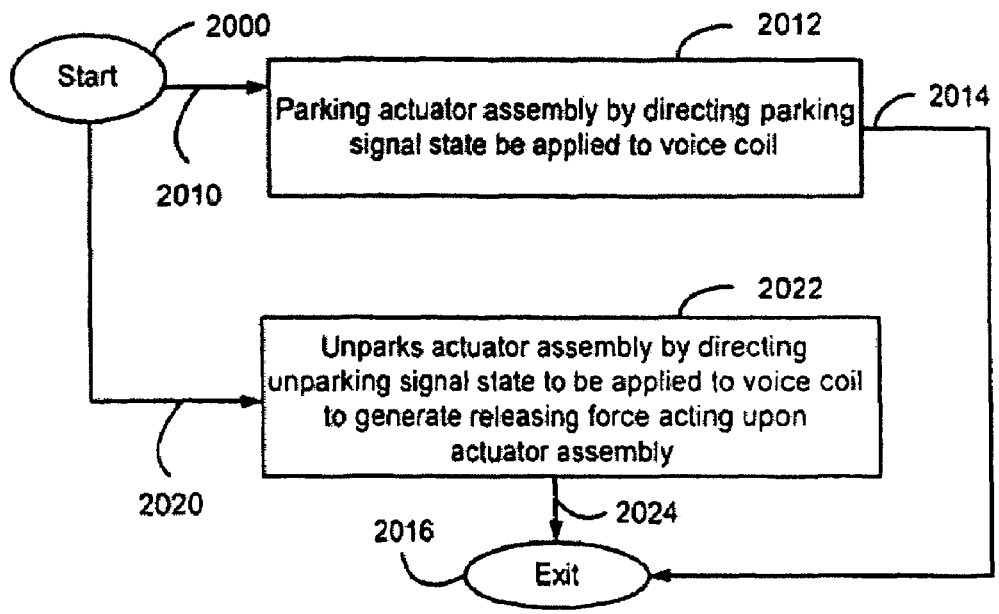
FIG. 9A shows a detail of the method of operating the voice coil motor assembly as program steps of the servo controller program system, residing in the servo memory as shown in FIG. 7.

FIG. 9A shows a detail of the method of operating the voice coil motor assembly 18 as program steps of the servo controller program system 2000, residing in the servo memory 1040. Operation 2012 parks the actuator assembly 18 by directing a parking signal state to be applied 242 to the voice coil 14. This results in the head gimbal assembly 60 being parked as shown in FIGS. 1C, 2A, and 2D. In parking the head gimbal assembly 60, the actuator assembly 58 is parked. Operation 2022 unparks the actuator assembly 58. The servo controller 1030 directs 502 the voice coil driver 500 to apply 242 an unparking signal state to the voice coil 14. The voice coil motor assembly 18 generates an initial releasing force 198 which acts upon the actuator assembly 58.

Figure 9B:
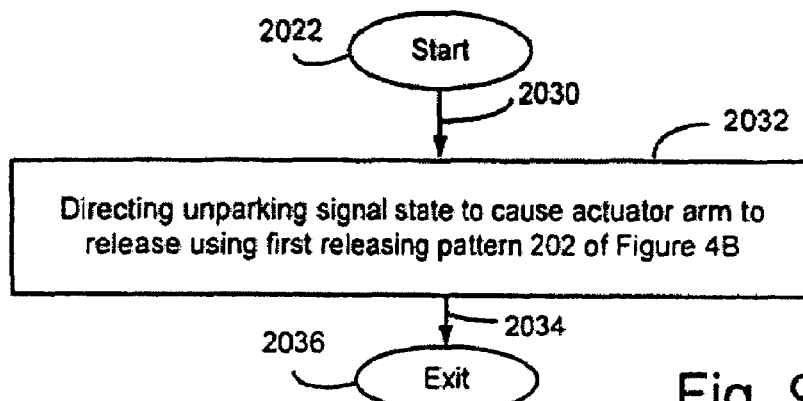
FIG. 9B shows a detail of the unparking of FIG. 9A, where the actuator assembly uses the first initial releasing force pattern as shown in FIG. 4B.

FIG. 9B shows a detail unparking operation 2022 of FIG. 9A. Operation 2032 directs the unparking signal state to cause the actuator arm to release using the first initial releasing pattern 202 of FIG. 4B.

Figure 9C:
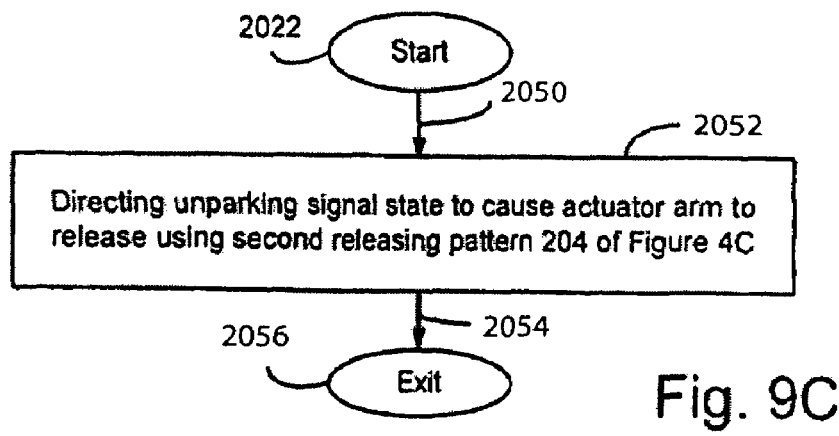
FIG. 9C shows a detail of the unparking of FIG. 9A, where the actuator assembly uses the second initial releasing force pattern as shown in FIG. 4C.

FIG. 9C shows a detail unparking operation 2022 of FIG. 9A. Operation 2052 directs the unparking signal state to cause the actuator arm to release using the second initial releasing pattern 204 of FIG. 4C.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A voice coil motor assembly for a Contact Start/Stop (CSS) hard disk drive, comprising:
   a voice coil with a voice coil bias steel coupled thereto;
   a yoke assembly comprising:
   a top proximity latch magnet attached to a yoke top plate;

a bottom proximity latch magnet attached to a yoke bottom plate, and set such the top and bottom proximity latch magnets are face to face with a space in between them to allow said voice coil bias steel to enter and exit; and said yoke top plate is attached to said yoke bottom plate;

wherein said yoke top plate is attached to a top voice coil fixed magnet;

wherein said yoke bottom plate is attached to a bottom voice coil fixed magnet;

wherein said top proximity latch magnet and said bottom proximity latch magnet attract and hold said voice coil bias steel therebetween to provide a magnetic proximity latch for a crash stop of said CSS hard disk drive.

2. The voice coil motor assembly of claim 1, wherein said top proximity latch magnet and said bottom proximity latch magnet are configured to attract said voice coil bias steel with an initial releasing force of not more than 80 grams of force.

3. The voice coil motor assembly of claim 2, wherein said initial releasing force is not more than 60 of said grams of force.

4. The voice coil motor assembly of claim 3, wherein said initial releasing force is not more than 50 of said grams of force.

5. The voice coil motor assembly of claim 4, wherein said initial releasing force is not more than 40 of said grams of force.

6. An actuator assembly for use with said voice coil motor assembly in said CSS hard disk drive, of claim 1, comprising:

said voice coil attached to said voice coil bias steel.

7. The actuator assembly of claim 6, further comprising: said voice coil attached to a magnetically weakened voice coil crash stop for contact with a yoke contact crash stop included in said yoke assembly.

8. The actuator assembly of claim 7, wherein said magnetically weakened voice coil crash stop contacts said yoke contact crash stop to create a magnetically weakened contact latch.

9. The actuator assembly of claim 7, wherein said magnetically weakened voice coil crash stop is insulated to keep any magnetic contact latch from forming.

10. The actuator assembly of claim 7, wherein said magnetically weakened voice coil crash stop is primarily composed of a material less magnetically permeable than stainless steel.

11. The voice coil motor assembly, as a product of the process comprising the steps of:

mounting said actuator assembly of claim 6 by an actuator pivot to a disk base plate; wherein said actuator pivot is included in said actuator assembly;

inserting a yoke mount coupling into a base yoke mount coupling including said disk base plate;

positioning said voice coil between said top voice coil fixed magnet and said bottom voice coil fixed magnet to create said magnetic proximity latch for the crash stop; wherein said magnetic proximity latch is created by attraction of said voice coil bias steel to said top proximity latch magnet and to said bottom proximity latch magnet; and fixedly attaching said yoke assembly to the disk base plate.

12. The voice coil motor assembly mounted upon said disk base plate of claim 11, wherein the step fixedly attaching said yoke assembly is further comprised of the step of:

fixedly attaching said yoke assembly to said disk base plate with screws in said yoke top plate.

13. A voice coil motor assembly for a Contact Start/Stop (CSS) hard disk drive, comprising:

an actuator assembly mounted by an actuator pivot to a disk base plate;

wherein said actuator assembly includes said actuator pivot coupled with a voice coil; and said voice coil is attached to a voice coil bias steel;

a yoke assembly, comprising:

a top proximity latch magnet attached to a yoke top plate;

a bottom proximity latch magnet attached to a yoke bottom plate;

said yoke top plate is attached to said bottom plate;

said yoke top plate is attached to a top voice coil fixed magnet;

said yoke bottom plate is attached to a bottom voice coil fixed magnet; and wherein said top proximity latch magnet and said bottom proximity latch magnet are fixed face-to-face with each other and have a space between them through which said voice coil bias steel passes and stops when the actuator assembly is parked;

wherein said voice coil is positioned between said top voice coil fixed magnet and said bottom voice coil fixed magnet;

wherein a magnetic proximity latch is created by attraction of said voice coil bias steel to said top proximity latch magnet and to said bottom proximity latch magnet; and wherein said yoke assembly is fixedly attached to said disk base plate.

14. The voice coil motor assembly of claim 1, wherein said yoke assembly includes a yoke mount coupling placed into a base yoke mount coupling included in said disk base plate.

15. The voice coil motor assembly of claim 1, wherein said yoke assembly is fixedly attached to said disk base plate and is further comprised of at least two screws attaching through said yoke top plate into said disk base plate.

16. The voice coil motor assembly of claim 1, wherein said top proximity latch magnet and said bottom proximity latch magnet are configured to attract said voice coil bias steel with an initial releasing force of not more than 80 grams of force.

17. The voice coil motor assembly of claim 16, wherein said initial releasing force is not more than 60 of said grams of force.

18. The voice coil motor assembly of claim 17, wherein said initial releasing force is not more than 50 of said grams of force.

19. The voice coil motor assembly of claim 18, wherein said initial releasing force is not more than 40 of said grams of force.

20. The voice coil motor assembly of claim 1, further comprising: said voice coil attached to a magnetically weakened voice coil crash stop for contact with a yoke contact crash stop included in said yoke assembly.

21. The voice coil motor assembly of claim 20, wherein said magnetically weakened voice coil crash stop contacts said yoke contact crash stop to create a magnetically weakened contact latch.

22. The voice coil motor assembly of claim 20, wherein said magnetically weakened voice coil crash stop is insulated to keep any magnetic contact latch from forming.

23. The voice coil motor assembly of claim 20, wherein said magnetically weakened voice coil crash stop is primarily composed of a material less magnetically permeable than stainless steel.

24. A crash start/stop (CSS) hard disk drive (10), comprising:

a pair of top and bottom proximity latch magnets (32 and 34) positioned face-to-face to each other with a gap between them, and respectively mounted to fixed top and bottom yoke plates (20 and 22) in a yoke assembly (8);

an actuator assembly having an actuator arm (50) with a head gimbal assembly (60) at a distal end thereof, and the actuator assembly able to swing on an actuator pivot (16);

a voice coil (14) that rides on a near end of the actuator arm (50), and that can swing the actuator assembly to position said head gimbal assembly (60), wherein the voice coil (14) operates within a space between voice coil fixed magnets (24 and 26) mounted within the yoke assembly (8);

a voice coil bias steel (36) extending from the voice coil (14) and forming a tip that just swings into said gap between the top and bottom proximity latch magnets (32 and 34) when the actuator assembly is in a parked position;

wherein, the top and bottom proximity latch magnets (32 and 34) and the voice coil bias steel (36) combine to form a magnetic proximity latch (6) that requires an initial force to release said actuator assembly from its parked position that is substantially less than 100 grams of force; and wherein, said actuator assembly is enabled to stay parked under a predetermined magnitude of rotary shock.

25. The crash start/stop (CSS) hard disk drive (10) of claim 24, further comprising:

a yoke crash stop (30) extended from the top yoke plate (20);

a voice coil crash stop (38) attached to the voice coil (14) and adjacent to the voice coil bias steel (36);

a magnetically weakened contact latch (39) formed between the yoke crash stop (30) and the voice coil crash stop (38), and including impermeable and/or insulative material;

wherein, said initial force to release said actuator assembly from its parked position is on the order of 75 grams of force.

* * * * *